с
US012312082B2

(12) United States Patent
Zapata

(10) Patent No.: US 12,312,082 B2
(45) Date of Patent: May 27, 2025

(54) PROPULSION DEVICE AND ASSOCIATED METHOD FOR CONTROLLING THE LANDING OF SUCH A PROPULSION DEVICE

(71) Applicant: ZIPAIR, Le Rove (FR)

(72) Inventor: Frankie Zapata, Le Rove (FR)

(73) Assignee: ZIPAIR, Le Rove (FR)

(*) Notice: Subject to any disclaimer, the term of this patent is extended or adjusted under 35 U.S.C. 154(b) by 420 days.

(21) Appl. No.: 17/802,549

(22) PCT Filed: Mar. 2, 2021

(86) PCT No.: PCT/FR2021/050348
§ 371 (c)(1),
(2) Date: Aug. 26, 2022

(87) PCT Pub. No.: WO2021/176172
PCT Pub. Date: Sep. 10, 2021

(65) Prior Publication Data
US 2023/0094788 A1 Mar. 30, 2023

(30) Foreign Application Priority Data
Mar. 2, 2020 (FR) ..................................... 2002096

(51) Int. Cl.
B64C 39/02 (2023.01)
B64C 15/02 (2006.01)
(Continued)

(52) U.S. Cl.
CPC ............ *B64C 39/026* (2013.01); *B64C 15/02* (2013.01); *B64C 25/001* (2013.01); *B64C 25/32* (2013.01); *B64C 2025/008* (2013.01)

(58) Field of Classification Search
CPC ..... B64C 39/026; B64C 25/001; B64C 25/32; B64C 2025/008; B64C 2025/325;
(Continued)

(56) References Cited

U.S. PATENT DOCUMENTS 2,927,747 A * 3/1960 Bennie .................... B64C 25/52
244/17.17
2,953,321 A * 9/1960 Robertson ............. B64C 39/026
180/117
(Continued)

FOREIGN PATENT DOCUMENTS

CA 2844721 A1 * 9/2015 ............. B64C 15/12
CA 3113031 A1 * 9/2021 ............. B64C 25/58
(Continued)

OTHER PUBLICATIONS

International Search Report (PCT/ISA/210) and Written Opinion (PCT/ISA/237) mailed on May 27, 2021, by the European Patent Office as the International Searching Authority for International Application No. PCT/FR2021/050348. (12 pages).

Primary Examiner — Richard Green
Assistant Examiner — Michael A. Fabula
(74) Attorney, Agent, or Firm — BUCHANAN, INGERSOLL & ROONEY PC

(57) ABSTRACT

A propulsion device includes a platform, a thrust unit, support means arranged to hold and support the thrust unit, integrally cooperating with the platform via one or more mechanical connections, projecting means, integrally cooperating via mechanical connections with the platform, a central foot, passing through the center of inertia of the propulsion device and integrally cooperating via a mechanical connection at its proximal end with the platform. In order to enable a landing of said propulsion device on receiving surfaces having relatively small dimensions with respect to the propulsion device and/or moving surfaces, the projecting (Continued)

means and the central foot are mutually arranged so that the central foot always provides the first contact between the device and a surface receiving the device.

12 Claims, 7 Drawing Sheets

(51) Int. Cl.
*B64C 25/00* (2006.01)
*B64C 25/32* (2006.01)

(58) Field of Classification Search
CPC ........ B64U 60/40; B64U 60/50; B64D 45/06; B64D 45/0005; B64G 1/625; B64G 1/1071
See application file for complete search history.

(56) References Cited

U.S. PATENT DOCUMENTS

| | | | | |
|---|---|---|---|---|
| 3,662,973 | A * | 5/1972 | Paine ................ | B64C 39/026 |
| | | | | 244/1 R |
| 6,008,742 | A * | 12/1999 | Groves ............... | G08G 5/0095 |
| | | | | 340/963 |
| 6,927,702 | B2 * | 8/2005 | Wiplinger .......... | B64D 45/0005 |
| | | | | 340/963 |
| 8,714,480 | B2 * | 5/2014 | Prud'Homme-Lacroix ............... | |
| | | | | B64C 25/52 |
| | | | | 244/102 R |
| 9,033,276 | B1 * | 5/2015 | Calvert ............... | B64C 25/10 |
| | | | | 244/102 R |
| 10,239,615 | B2 * | 3/2019 | Duru .................. | B64C 27/20 |
| 10,245,500 | B2 * | 4/2019 | Chen ................... | A63C 17/01 |
| 11,001,380 | B2 * | 5/2021 | Nahuel-Andrejuk .................... | |
| | | | | G05D 1/101 |
| 11,059,582 | B2 * | 7/2021 | Nahuel-Andrejuk .................... | |
| | | | | B64U 10/14 |
| 11,453,479 | B2 * | 9/2022 | Zapata ................ | B64D 37/06 |
| 2002/0113165 | A1 * | 8/2002 | Moshier .............. | B64C 39/026 |
| | | | | 244/4 A |
| 2003/0011493 | A1 * | 1/2003 | Wiplinger ........... | B64C 25/28 |
| | | | | 340/960 |
| 2005/0269449 | A1 * | 12/2005 | Muylaert ............ | B64C 25/32 |
| | | | | 244/100 R |
| 2005/0269453 | A1 * | 12/2005 | Muylaert ............ | B64C 25/68 |
| | | | | 244/129.1 |
| 2005/0279883 | A1 * | 12/2005 | Muylaert ............ | B64C 25/32 |
| | | | | 244/100 R |
| 2005/0279884 | A1 * | 12/2005 | Tebon ................. | B64C 25/00 |
| | | | | 244/100 R |
| 2005/0279885 | A1 * | 12/2005 | Tebon ................. | B64C 25/00 |
| | | | | 244/100 R |
| 2007/0221783 | A1 * | 9/2007 | Parks .................. | G06Q 30/08 |
| | | | | 244/102 A |
| 2009/0224095 | A1 * | 9/2009 | Cox .................... | B64U 10/13 |
| | | | | 244/17.23 |
| 2011/0204182 | A1 * | 8/2011 | Prud'Homme-Lacroix ............... | |
| | | | | B64C 25/52 |
| | | | | 244/102 R |
| 2016/0272308 | A1 * | 9/2016 | Gentry ................ | B64U 50/14 |
| 2017/0057626 | A1 | 3/2017 | Lauder | |
| 2017/0267334 | A1 * | 9/2017 | Tsai .................... | G06V 20/13 |
| 2018/0086482 | A1 * | 3/2018 | Bistuer ............... | B64F 1/125 |
| 2018/0127094 | A1 * | 5/2018 | Zapata ................ | G05D 1/0858 |
| 2018/0208312 | A1 * | 7/2018 | Zapata ................ | G05D 1/0808 |
| 2019/0135415 | A1 * | 5/2019 | Zapata ................ | G01C 9/005 |
| 2019/0161188 | A1 | 5/2019 | Zapata | |
| 2020/0277044 | A1 * | 9/2020 | Kerr ................... | B64C 25/28 |
| 2021/0144904 | A1 * | 5/2021 | Andrejuk ............ | G05D 1/101 |
| 2021/0171188 | A1 * | 6/2021 | Charron ............. | B64C 39/026 |
| 2021/0300547 | A1 * | 9/2021 | Stanhope ............ | B64F 1/16 |
| 2022/0024586 | A1 | 1/2022 | Zapata | |
| 2023/0111162 | A1 * | 4/2023 | Zapata ................ | B64C 39/026 |
| | | | | 60/230 |

FOREIGN PATENT DOCUMENTS

| | | | | |
|---|---|---|---|---|
| CN | 108791897 | A * | 11/2018 | |
| CN | 114476128 | A * | 5/2022 | |
| CN | 115367101 | A * | 11/2022 | ............ B64C 25/32 |
| CN | 116495175 | A * | 7/2023 | |
| CN | 116812198 | A * | 9/2023 | |
| EP | 2610173 | A1 | 7/2013 | |
| WO | WO-0247978 | A2 * | 6/2002 | .......... B64C 39/026 |
| WO | 2017174942 | A1 | 10/2017 | |
| WO | 2017174944 | A1 | 10/2017 | |
| WO | 2019227209 | A1 | 12/2019 | |

* cited by examiner

PROPULSION DEVICE AND ASSOCIATED METHOD FOR CONTROLLING THE LANDING OF SUCH A PROPULSION DEVICE

TECHNICAL FIELD

The invention relates to the field of propulsion devices and/or systems, generally vertical-propulsion, preferably but non-limitatively adapted or arranged to provide the movements of a passenger having boarded said propulsion device or any goods present, the transportation of which is to be provided by the propulsion device. The invention relates in particular to improvements of such propulsion devices and/or systems, with a view in particular to facilitating the landing of said devices and/or systems on receiving surfaces having small dimensions, being capable of being in addition or separately in motion, such as for example when such surfaces are present at sea. The invention aims to be very simple to implement and accessible to the greatest number of propulsion devices.

In the remainder of the document, the invention will be described, preferably but non-limitatively, as applied to a propulsion device dedicated to moving in the air, also known as aircraft or heavier-than-air aircraft, such a propulsion device being arranged to supply a substantially vertical take-off and landing capability. By way of non-limitative examples, such a propulsion device can consist of a drone, a helicopter, an embodiment example of which is described in document US2011/204182A1, or a "Flyboard Air", an embodiment example of which is described in document WO 2017/174942 A1. However, the invention is not limited to these application examples alone, and could instead be employed with respect to any type of propulsion device.

Technological Background

The idea of flying or soaring in the air is as old as humanity: early humans probably wished to imitate the flight of birds and many researchers have devoted themselves to the design of flying devices. Among the most well-known was Leonardo de Vinci, who around 1500 carried out the first known studies of the flight of birds and attempted to design a mechanical imitation of such bird flight. Thus he drew and proposed several ideas for flying machines, similar to the aeroplane, helicopter and parachute. However, all these ideas were based on exploitation of muscular energy to operate said flying machines, which at the time still seemed impossible to envisage. The first flights on a flying machine controlled by flight control surfaces were carried out by the Wright brothers in the USA at the beginning of the twentieth century. At this same period the first motorized flying machines began to be developed which would later give rise to aeroplanes and helicopters. Such motorized flying machines are currently known as heavier-than-air aircraft consisting of aircraft the lift of which is generally by means of a device allowing the creation of an aerodynamic force and a wing system that is fixed in the case of aeroplanes or rotating in the case of helicopters, allowing lift to be created.

More particularly, the possibility for a helicopter, by virtue of its arrangement and its operation, to take off and land on relatively restricted and unprepared terrain makes it particularly advantageous, even in some cases indispensable, for carrying out certain missions and operations, despite its limited range and speed. A helicopter, an embodiment example of which is described in document US2011/204182A1, can generally include a limited number of sub-assemblies, such as:

- an airframe, generally constituted by a fuselage and a landing gear arranged to assist in the operations of take-off and landing. The fuselage consists of the cockpit or the cabin of the helicopter within which one or more passengers and/or (co-)pilots can be on board. As regards the landing gear, more particularly adapted or arranged to provide the contact between a receiving surface and the helicopter, it is in most cases fixed, and generally comprises two landers or skids integrally cooperating respectively via suitable mechanical links with the fuselage;
- a wing system, comprising one or more lift and/or anti-torque rotors;
- a power train, generally constituted by a piston engine or one or more turbines advantageously cooperating with the wing system and allowing the rotors comprised within the wing system to be driven;
- flight controls, comprising levers and pedals arranged inside the cockpit. Such controls are most often duplicated, so as to be capable of being employed by the pilot and/or a co-pilot of the helicopter;
- on-board services, comprising the set of devices or systems allowing the power supplies necessary for operation of the helicopter and for comfort within the latter, such as for example, fuel, electricity and air conditioning;
- avionics, consisting of the set of electronic equipment present within the helicopter, such as for example, sensors, controllers, actuators and/or communication systems;
- payload facilities, generally situated on the sides of a helicopter, consisting of anchorages making it possible to attach and transport different accessories, such as missiles, observation pods or reserve fuel tanks.

Humans still constantly seek to push the boundaries of possibility: moving as freely as possible in space is an unchanging human preoccupation, or for some, an almost unachievable dream. Many machines have been designed, from the most sketchy to the most sophisticated, striving to attain this objective with varying degrees of success. More specifically, a particularly effective device has recently been developed, known as "Flyboard Air". It is described in particular in document WO2017/174944 A1, and has met with great success. FIGS. 1 and 2 thus respectively show a perspective view and an exploded view of a first non-limitative embodiment of such a propulsion device 10, some of the elements of which will be omitted from the description in the remainder of the document for reasons of simplicity.

Such a device 10 includes a main body 10a in the principal form of a platform 11 on which a passenger 1 can optionally board. Depending on the dimensions of the platform 11 and the power of the thrust unit 12 of the device 10, several passengers can optionally be on board said platform 11 at the same time. To this end, the platform 11 has one or more zones 11a, 11b arranged to receive the feet or footwear of the passenger 1, as FIG. 2 in particular shows more clearly. As a variant or in addition, such a device 10 can be arranged to provide the transportation of goods.

The body 10a of the propulsion device 10, described with reference to FIGS. 1 and 2, includes a thrust unit 12 cooperating with the platform 11.

As indicated in said FIG. 2, by way of non-limitative example, the thrust unit 12 advantageously consists of a pair of thrust sub-units 12*a* and 12*b* each comprising two thrusters. Thus, a first thrust sub-unit 12*a* includes two thrusters 12*a*1 and 12*a*2. The same applies for the thrust sub-unit 12*b* which includes two thrusters 12*b*1 and 12*b*2. As a variant, such sub-units could include more than two thrusters. In order to provide optimal conditions of manoeuvrability by virtue of the orientation of the passenger's body, according to the embodiment described with reference to FIGS. 1 and 2, the thrusters of the thrust unit 12 are advantageously positioned as close as possible to the centre of the body 10*a* of the device 10. Thus, preferably, as indicated in FIGS. 1 and 2, the zones 11*a* arranged on the platform 11 to receive the feet or footwear of the passenger 1 will advantageously be positioned on either side of said thrust unit 12.

In order to be able in particular to pivot easily, perform curving movements and thus enhance the movements that can be performed by said propulsion device 10, the thrust unit 12 can advantageously include two secondary thrusters 19*a* and 19*b* for course correction, arranged offset with respect to a transverse axis of the platform. As a variant or in addition, in order to dispense with the use of such secondary thrusters, the invention provides for the addition to all or part of the thrusters of the thrust sub-unit(s) 12*a*, 12*b* of an orientable fluid outlet, of the orientable cone type of a fluid outlet of a jet ski for example, which would cooperate with the jet nozzle of the gaseous stream of the thruster(s) in question, along one or more suitable respective mechanical links, such as for example pivot or fixed links.

The different thrusters of the thrust unit are held and supported by support means 14. These means 14 constitute the functional equivalent of a frame supporting the platform 11. As mentioned above, such a thrust unit 12 includes two thrust sub-units 12*a* and 12*b*, each comprising two thrusters, referenced 12*a*1 and 12*a*2 for the first, and 12*b*1 and 12*b*2 for the second. Such thrusters preferably consist of jet turbine engines. A jet turbine engine is a thermal engine, commonly used in aeronautics, which converts the potential energy contained in a fuel, for example kerosene or equivalent, in association with an oxidizing agent, in this case ambient air aspirated via a fluid intake of the body 10*a*, into kinetic energy. This kinetic energy generates a reaction force in an elastic medium, in the opposite direction to the jet of a gaseous discharge. This results in an acceleration of a certain quantity of air between the fluid intake of the thruster and the jet nozzle thereof, producing a thrust by expansion in said jet nozzle. Such a thruster uses an air compressor with vanes or rotors. Any other type of fuel could optionally be utilized instead of the kerosene mentioned above.

In order to associate secondary thrusters 19*a* and 19*b* for course correction with the thrust sub-units 12*a* and 12*b* and thus allow curving paths, the support means 14 of a device 10 according to the invention can cooperate with secondary support means 15 arranged to cooperate with secondary thrusters 19*a* and 19*b* for course correction and hold these latter in a thrust orientation substantially parallel to a longitudinal axis of the platform 11. Such secondary thrusters 19*a* and 19*b* for course correction make it possible in particular to increase the ease of handling of said propulsion device. As a variant, an arrangement of thermal thrusters 19*a* and 19*b* for course correction could consist of the utilization of a turbo-prop engine, instead of each electric turbine, substantially oriented parallel to the thrusters of thrust sub-units 12*a* and 12*b*. In order to retain a high level of responsiveness, an orientable fluid outlet, of the orientable cone type of a fluid outlet of a jet ski, could cooperate with the gas jet nozzle of the secondary thermal thruster. By orienting said cone in a median plane of the platform 11, a result is obtained which in sum is close to that provided by the utilization of electric turbines.

Furthermore, in order to facilitate the take-off and landing of the propulsion device, the body 10*a* of such a device 10 includes projecting means 17, also capable of being similar to a landing gear, integrally cooperating via suitable mechanical links with the platform 11 and arranged to prevent any impact or direct contact between the ground, or more broadly a receiving surface, and the thrust unit 12 of the device 10 during landing and/or take-off of the latter. Finally, said projecting means 17 are arranged to provide the contact between a receiving surface G and the propulsion device 10. Such means 17 can comprise or consist in particular of four legs of sufficient lengths so that the jet nozzle(s) of the thrust unit 12 cannot impact the ground and also to provide some stability, when the device is on the ground or on a take-off site, not shown in FIGS. 1 and 2, so that the passenger can effectively board the platform 11. As a variant, such means 17 could consist of a pair of skis or any other suitable element for providing some stability depending on the nature of the ground or of the device support on which such a device is capable of landing. As a variant or in addition, to avoid a propulsion device impacting an obstacle during the flight phases, such means 17 can be partially or wholly retractable, foldaway and/or telescopic.

As mentioned before, the thrust unit(s) of the propulsion device according to the first embodiment are arranged so as to reduce the moment of inertia that the passenger must overcome in order to modify the attitude of the device 10 by using their body, and thus to move. As a result, the movements of the passenger, using their body, will generate the path of said propulsion device. The different elements described above for optimizing the ease of handling of said propulsion device, such as the secondary thrusters or even the orientable fluid outlet(s), do not allow the ease of handling to be facilitated for a propulsion device the thrust unit(s) of which are relatively far from the centre of gravity or the purpose of which is not necessarily to transport one or more passengers, as will be seen with reference to FIG. 3, which illustrates diagrammatically a second embodiment of a propulsion device 10. According to a non-limitative embodiment example described with reference to FIG. 3, a propulsion device 10 includes a platform 11, advantageously central, four thrust units 12 each including a deflector assembly provided with two deflector elements, such deflector elements being mounted mobile just below the exhaust outlet of the nozzle of the jet turbine engine, assuming a vertically-oriented jet turbine engine, these latter being capable of actuation and positioning in the thrust exhaust and/or stream path. When said deflector elements are in open configuration, the thrust induced by the jet turbine engine passes through a space left free between these latter, thus allowing the motor to operate at full power, thus providing a vertical lift. The propulsion device 10 also includes support means 14 arranged to hold and support said thrust units 12. As in the solutions described above, such means 14 constitute the functional equivalent of a frame supporting the platform 11. The support means 14 also integrally cooperate with said platform 11 via one or more suitable mechanical links. Preferably but non-limitatively, according to FIG. 4, such mechanical links can advantageously consist of fixed links.

Furthermore, as in the first embodiment described with reference to FIGS. 1 and 2, in order to facilitate the take-off and landing of the propulsion device, such a device 10 includes projecting means 17, also capable of being similar to a landing gear, integrally cooperating via suitable mechanical links with the platform 11, optionally, as described with reference to FIG. 3, via the support means 14, and arranged to prevent any impact or direct contact between the ground, or more broadly, a surface for receiving said propulsion device, and the thrust unit 12 of the device 10. Finally, said projecting means 17 are arranged to provide the contact between a receiving surface and the propulsion device 10. Such projecting means 17 can comprise or consist in particular of four legs of sufficient lengths so that the jet nozzle(s) of the thrust unit 12 cannot impact the ground and also to provide some stability when the device is on the ground or on a take-off site, also known as receiving surface, not shown in FIGS. 1 and 2, so that the passenger can effectively board the platform 11. As a variant, such means 17 could consist of a pair of skis or any other suitable elements for providing some stability depending on the nature of the ground, of the receiving surface, or of the device support on which such a device is capable of landing. As a variant or in addition, to avoid a propulsion device impacting an obstacle during the flight phases, such means 17 can be partially or wholly retractable, foldaway and/or telescopic.

As mentioned above, a propulsion device, such as that described, for example, with reference to FIGS. 1 and 2 or even to FIG. 3, can advantageously be arranged or configured to provide the transportation of goods or even to allow movements of one or more passengers in space. As a variant, such a propulsion device can consist of an aerial drone. An aerial drone, also known as an unmanned aerial vehicle (UAV) or unmanned aerial system (UAS), is defined as any aircraft without passenger or pilot on board, suitable for flying autonomously or to be controlled remotely by a third person. The dimensions of an aerial drone can vary from a few centimetres for miniature models to a few metres for specialized drones, in particular in the fields of particular applications, in terms of surveillance, intelligence, combat, transport, or leisure. The flight range can be comprised between a few minutes to greater than tens of hours for long-endurance drones.

As for a helicopter, an aerial drone can generally include a non-limitative number of sub-assemblies, such as:
  a frame consisting of the base or mechanical structure of the drone including in particular a landing gear, said landing gear being more particularly adapted or arranged to provide the contact between a receiving surface and the aerial drone. Generally, the drones are distinguished by the number of arms of which they are composed;
  a propulsion system, comprising non-limitatively one or more motors in the form of one or more jet turbine engines, or as a variant or in addition, one or more rotors, one or more propellors ensuring the production of a thrust force, one or more electronic speed controllers (ESC) arranged to control the respective speeds, directions and/or rotations of the motors, one or more batteries arranged to supply the energy required by the other electrical components in order to operate;
  a flight controller arranged to receive and process the command signals transmitted by a remote electronic object, such as for example a remote control or radio control, comprising in particular a processing unit, possibly in the form of one or more microprocessors or microcontrollers, as well as communication means, in order to provide control of the drone from a remote site;
  means for capturing images, arranged to allow submersion and the taking of aerial shots, optionally in real time, including in particular an on-board camera.

As mentioned above, the known propulsion devices described above, more particularly a helicopter, a Flyboard Air or even an aerial drone, prove particularly advantageous since in contrast to aeroplanes with fixed wing systems, they are generally capable of adapting to take off and land on terrain not planned for such take-offs and/or landings. However, the known propulsion devices have some limits, in particular in some specific conditions and/or situations, such as, non-limitatively, during landing and/or take-off on receiving surfaces the dimensions of which are small or even relatively limited with respect to said propulsion devices, such receiving surfaces being capable of being in addition or separately in motion. By way of non-limitative examples, such receiving surfaces can consist of a nautical craft, a boat or any other vessel: in this case referred to as water landing of the propulsion device. As a result of its presence on a rising and falling surface, such a boat can be subject to various movements, mainly on three axes defined such that:
  a longitudinal axis is defined as an axis oriented from fore to aft of the boat,
  a vertical axis is defined as an axis oriented from bottom to top of the boat and,
  a transverse axis is defined as an axis oriented from starboard to port of the boat.

Such movements of the boat can thus be distinguished among:
  roll, consisting of an oscillation movement of the boat from port to starboard about the longitudinal axis: the boat lists alternately to starboard and to port;
  surge, consisting of a translational movement of a boat along the longitudinal fore-and-aft axis: the boat moves forward and back alternately;
  yaw, consisting of a rotational movement on itself about the vertical axis: the boat performs a rotational movement on itself;
  heave, consisting of an up-and-down movement on the vertical axis: the boat performs an up-and-down movement;
  pitch, consisting of a periodic upward and downward tilting movement within the transverse axis of the boat: the boat swings alternately fore-to-aft;
  sway, consisting of a translational movement on the transverse axis towards port or starboard: the boat moves alternately to starboard and to port.

Said movements undergone by the boat are generally frequent and induced by the meteorological conditions. In fact, during the action of the wind blowing on the ocean, part of the energy released is transmitted in particular to the sea, then driving waves, such waves being greater, the harder and longer the wind blows. Such waves, possibly during their impact on the boat's hull, can thus cause hydrostatic and hydrodynamic stresses, often unequally distributed. The stability of the boat is then severely tested. Such instability of the boat impacts directly the take-off and/or the landing of a propulsion device that may wish to interact with the boat or more generally, a receiving surface in motion, since said propulsion device must then compensate for said instability of the boat while itself being in a relatively unstable position. Moreover, said propulsion device is also subject to the meteorological conditions, since the wind, rain or any storms can directly impact the stability and the movements of the propulsion device.

Furthermore, apart from the movements of the boat or of the receiving surface, the limited dimensions of said boat or of said receiving surface, if applicable with respect to the propulsion device, can also directly affect the successful performance of the landing and/or take-off of such a propulsion device. In fact, by way of non-limitative examples, during landing of a propulsion device in the form of a helicopter, the pilot of the latter generally first positions a first skid or lander in contact with the receiving surface, then placing said helicopter in a relatively unstable position, since the helicopter comprises only a single point of contact with the receiving surface. Next, the pilot must then position the second skid or lander in contact with the receiving surface. When said receiving surface is in motion and/or has limited dimensions with respect to the propulsion device, the pilot must then demonstrate expertise and skill so as to land safely: the ability of the pilot has a direct influence on the successful performance of the landing or water landing, such landing or water landing being generally irreproducible and a function of the pilot of the helicopter or more generally of the propulsion device that it is desired to land or water land, whether the pilot is on board within said device or remote from the latter.

In order to reduce the influence of a pilot or operator during the water landing of a propulsion device in the form of an aerial drone on the deck of a boat or vessel, researchers have attempted to develop new solutions. By way of example, in order to provide water landing of an aerial drone, a solution envisaged consists of employing a tensioned net of relatively large dimensions on the deck of the vessel into which the drone enters before being deactivated. This technology still proves relatively complex, since the vessel is in constant movement, still subject to the meteorological conditions. The aerial drone must thus be controlled so as to reach a minimum speed when it touches the net: the pilot or operator of the aerial drone, even when remote, must still demonstrate expertise and skill. Moreover, the use of a tensioned net on the deck of a vessel requires a vessel of significant dimensions in order to provide for the deployment of said net. Thus, such a solution in the form of a net is not suitable for a boat or a receiving surface the dimensions of which are small with respect to the projected surface area of the propulsion device on said boat or said receiving surface. Finally, the utilization of a tensioned net for receiving a propulsion device imposes limits with respect to the dimensions and the weight of said propulsion device, since the material and the structure of said net utilized must be capable of supporting and withstanding such weight and dimensions. To this end, the nets currently employed are designed to withstand propulsion devices the weight of which is limited to a maximum of thirty or forty kilograms. Furthermore, other solutions employing 3D recognition systems in particular, as described for example in document US2017/0267334A1, have been developed to facilitate the landing of an aerial drone on steep terrain. Such aerial drones deploying this solution have a landing gear composed of at least three arms. Such an arrangement makes it necessary to find an appropriate landing position to allow the deployment of the at least three arms, necessary for maintaining the equilibrium of the drone on the ground. To this end, the drone cannot be landed on any area that is difficult to access or in motion.

SUMMARY OF THE INVENTION

The invention makes it possible to meet all or part of the drawbacks resulting from the solutions that are known or mentioned above.

Among the numerous advantages contributed by the invention, it should be mentioned that the latter makes it possible to:

propose a propulsion device that is modular and adaptable in particular to be utilized in any type of propulsion device, regardless of the arrangement, type or structure of the thrust unit comprised within the propulsion device;

provide a propulsion device the landing of which on receiving surfaces having small dimensions, such receiving surfaces being capable of being in addition or separately in motion, such as for example, when said surfaces are present at sea, is greatly facilitated and automated, regardless of the level of expertise of the user or operator of said propulsion device.

According to a first subject, there is provided in particular a propulsion device including a platform, a thrust unit, support means arranged to hold and support said thrust unit, integrally cooperating via one or more suitable mechanical links with said platform, projecting means, integrally cooperating via suitable mechanical links with the platform, a central leg passing through the centre of inertia of the propulsion device and integrally cooperating via a suitable mechanical link at its proximal end with the platform. In order to allow a landing of said propulsion device on receiving surfaces having relatively limited dimensions with respect to the propulsion device and/or in motion, the projecting means and the central leg are mutually arranged so that the central leg is able to provide the first contact between said device and a surface for receiving said device.

Advantageously but non-limitatively, so as to optimize and control the landing of a propulsion device according to the invention, the latter can also include a proximity sensor arranged to deliver a measurement representative of a distance between said proximity sensor and the receiving surface.

Preferably but non-limitatively, with a view to increasing the accuracy of landing, the proximity sensor of a propulsion device according to the invention can integrally cooperate via a suitable mechanical link with the central leg.

So as to meet a large number of applications, the platform of a propulsion device according to the invention can be arranged to receive one or more passengers.

Advantageously but non-limitatively, the thrust unit of a propulsion device according to the invention can be arranged to supply a resultant thrust force oriented in a direction such as to supply a substantially vertical take-off and landing capability.

As a variant or in addition, a propulsion device according to the invention can include an actuator cooperating with the central leg: the central leg can then be retractable, said actuator being arranged to induce a translational movement of said central leg.

Still as a variant or in addition, so as to automate the landing of a propulsion device according to the invention, it can include actuators associated with the projecting means. The projecting means can then be retractable, each actuator being respectively arranged to induce translational movement, jointly or separately, of said projecting means.

Still with a view to automating the landing process of a propulsion device according to the invention, the actuators, respectively associated with the central leg or with the projecting means, can be controlled by electrical commands, said propulsion device also including a processing unit designed to generate said electrical commands based on a control setpoint and/or a reference system determined by one or more configuration parameters.

As a variant, the actuators, respectively associated with the central leg or with the projecting means, can be controlled by electrical commands, said propulsion device also including a processing unit designed to generate said electrical commands based on a representative measurement of a distance between said proximity sensor and the receiving surface. Said measurement is delivered by said proximity sensor to said processing unit.

When the interaction of a user or of an operator is necessary for controlling or more particularly landing a propulsion device according to the invention, the latter can include a human-machine input interface designed to translate a gestural sign of a user to an actuation setpoint of the central leg and/or of the projecting means or command means of the thrust unit.

Preferably but non-limitatively, according to the arrangement of the propulsion device or the nature of the application which the propulsion device must meet, the projecting means can comprise four peripheral legs or two landing skids.

According to a second subject, the invention relates to a method for controlling the landing of a propulsion device according to the first subject of the invention. Such a method makes it possible to provide an automatic control assistance to any user, whether novice or experienced, in particular when the receiving surface has dimensions that are relatively limited with respect to the propulsion device and/or is in motion; said method is implemented by the processing unit of the propulsion device according to the invention. Such a method for controlling the landing includes:

a. a step for collecting and comparing a first measurement of distance between the proximity sensor and the receiving surface delivered by the proximity sensor to a first predetermined threshold;

b. a step for preparing and delivering a command that can be interpreted by the actuator associated with the projecting means, so as to induce the joint or separate deployment of the projecting means.

Preferably but non-limitatively, according to the arrangement of the propulsion device, the method for controlling the landing of a propulsion device can also include two steps prior to the step for collecting and comparing a first measurement of distance between the proximity sensor and the receiving surface delivered by the proximity sensor to a first predetermined threshold. These steps consist of:

a. a step for collecting and comparing a second measurement of distance between the proximity sensor and the receiving surface delivered by the proximity sensor at a second predetermined threshold strictly higher than the first predetermined threshold;

b. a step for preparing and delivering a command that can be interpreted by the actuator associated with the central leg when said second distance measurement reaches the second predetermined threshold, so as to induce the deployment of said central leg.

In a mode where the projecting means are deployed separately, the step for preparing and delivering a command that can be interpreted by the actuator associated with the projecting means, so as to induce the deployments of the projecting means, can include three sub-steps. These sub-steps consist of:

a. a first sub-step for preparing and delivering a command that can be interpreted by the actuator associated with a first projecting means, so as to induce the deployment of said projecting means;

b. a second sub-step for preparing and delivering a command that can be interpreted by the actuator associated with a second projecting means, so as to induce the deployment of said second projecting means;

c. a third sub-step for preparing and delivering a command that can be interpreted by the actuators associated with a third and a fourth projecting means, so as to induce the respective deployments of said third and fourth projecting means.

In order to improve the control of the landing of a propulsion device according to the invention, by supplying a "vacuum cup" or suction effect, said device can also include command means cooperating with said thrust unit, and the method for controlling the landing according to the invention can include a step, subsequent to or jointly with the step for preparing and delivering, when said first distance measurement reaches the first predetermined threshold, a command that can be interpreted by the actuator associated with the projecting means, for preparing and delivering a command that can be interpreted by the command means associated with the thrust unit, so as to produce a stabilizing thrust reversal.

Preferably but non-limitatively, a method for controlling the landing of a propulsion device according to the invention can include a step, subsequent to the step for preparing and delivering a command that can be interpreted by the actuator associated with the projecting means, for preparing and delivering, when said first distance measurement reaches the first predetermined threshold, a command that can be interpreted by the actuator associated with the central leg, so as to permit the withdrawal of said central leg.

When landing has ended, preferably but non-limitatively, said device can also include command means cooperating with said thrust unit and the method for controlling the landing of a propulsion device according to the invention can include a step, subsequent to the step for preparing and delivering a command that can be interpreted by the actuator associated with the projecting means, for preparing and delivering a command that can be interpreted by the command means associated with the thrust unit, so as to induce the switching off of said thrust unit.

The invention also relates to a propulsion device including a processing unit arranged to implement a control method according to said invention.

BRIEF DESCRIPTION OF THE FIGURES

Other characteristics and advantages will become more clearly apparent on reading the following description and on examination of the attached figures, among which.

DETAILED DESCRIPTION

A propulsion device according to the invention will be described, in the remainder of the document, in the context of an application with a propulsion device dedicated to moving in the air, also known as aircraft or heavier-than-air aircraft, such a propulsion device being arranged to supply a substantially vertical take-off and landing capability. Such a propulsion device can optionally be arranged to transport one or more passengers and/or goods. By way of non-limitative examples, such a propulsion device can consist of a drone, a helicopter or a "Flyboard Air". However, the invention is not limited to these application examples alone, and could instead be employed with respect to any type of propulsion device.

Figure 1:
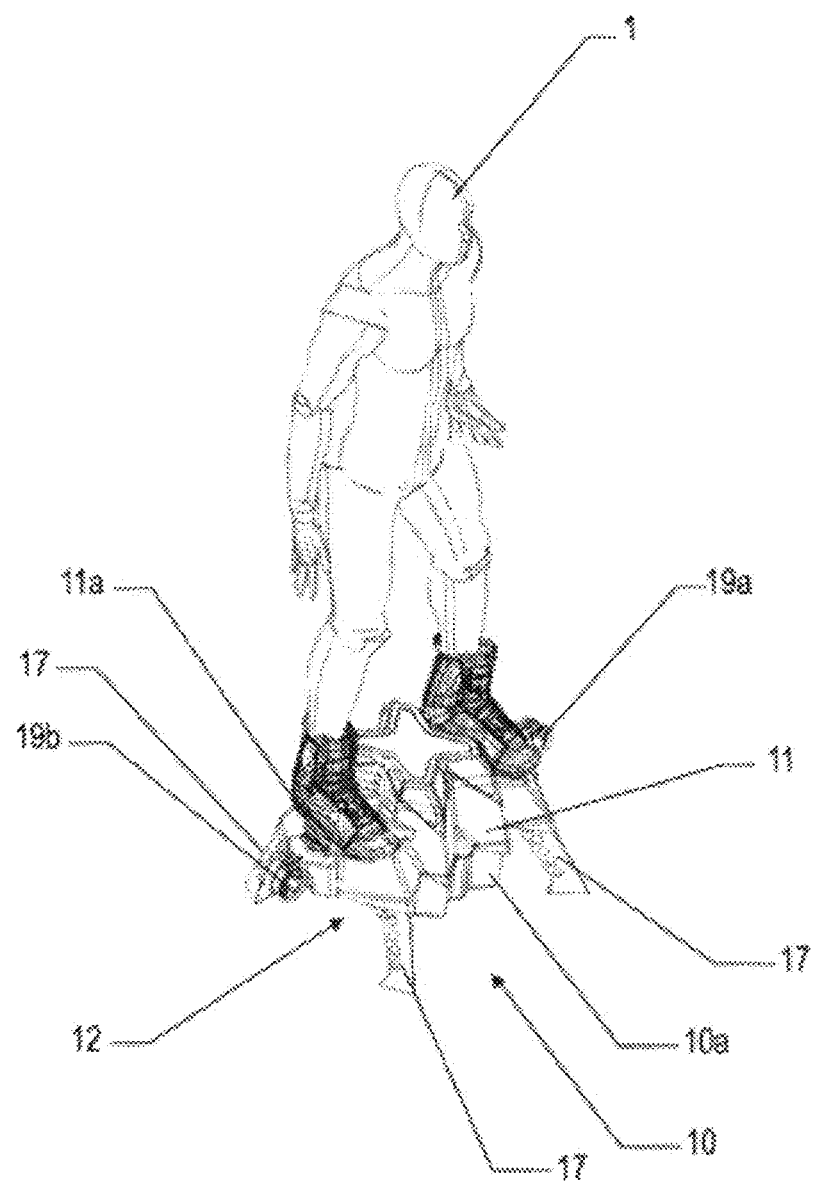
FIG. 1, described above, illustrates diagrammatically a first embodiment of a known propulsion device.
Figure 2:
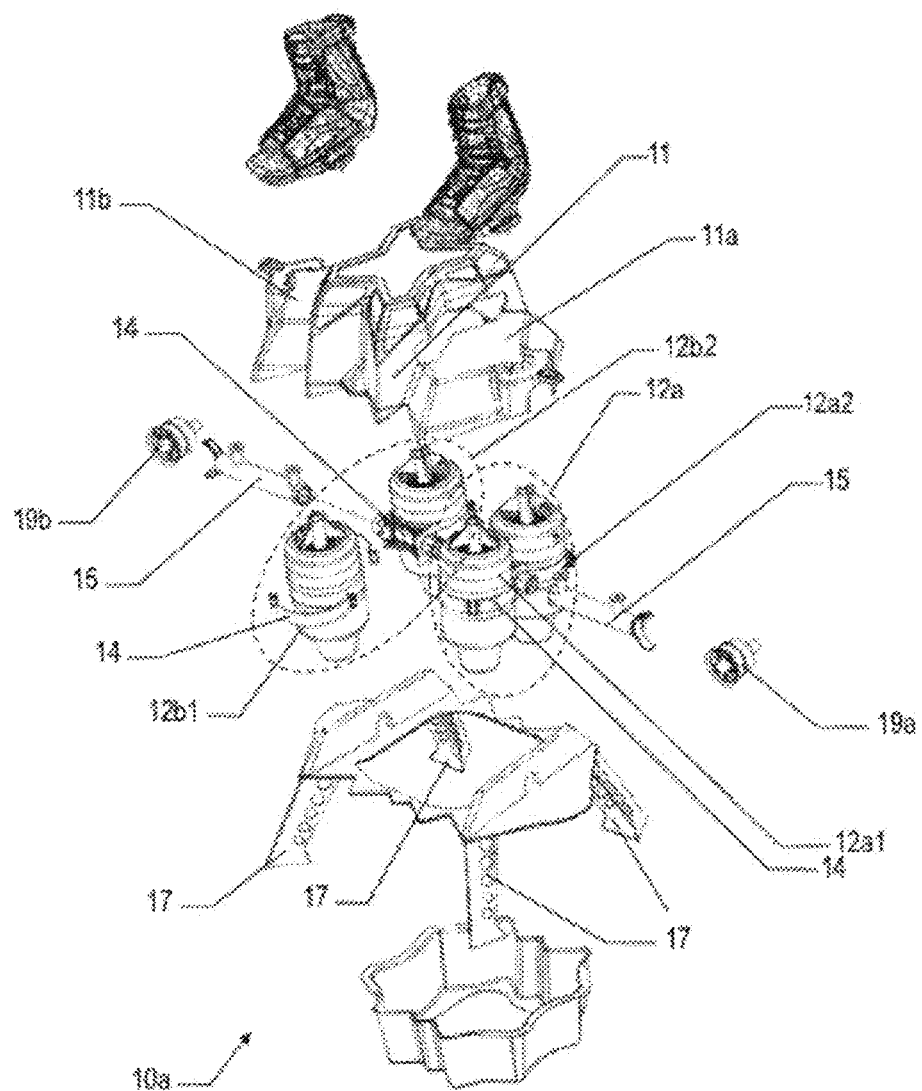
FIG. 2, described above, shows an exploded view of the first embodiment of a known propulsion device.
Figure 3:
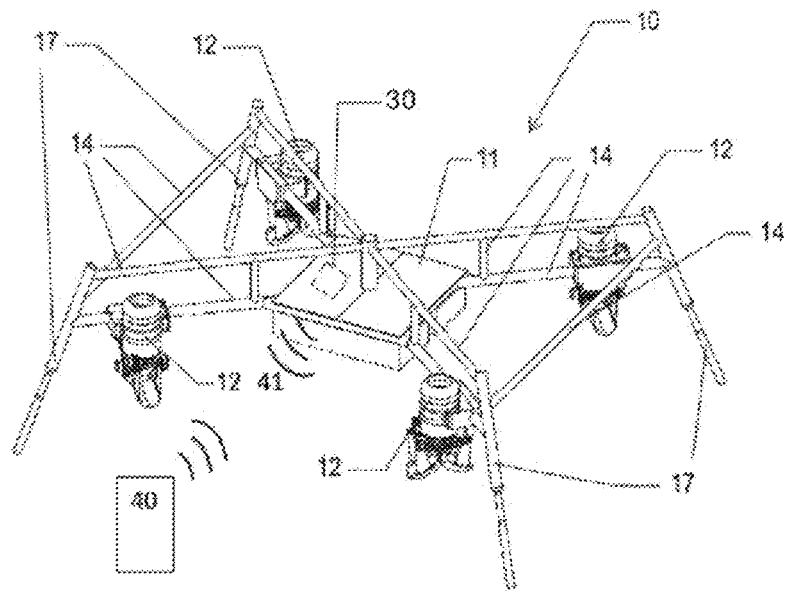
FIG. 3, described above, shows a perspective view of a second embodiment of a known propulsion device.
Figure 4:
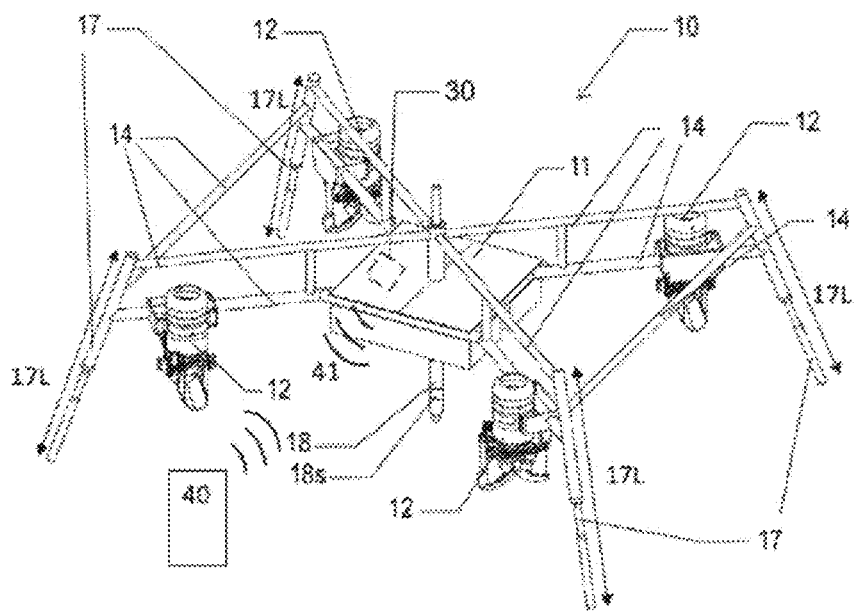
FIG. 4 illustrates diagrammatically a non-limitative embodiment of a propulsion device according to the invention.
Figure 5A:
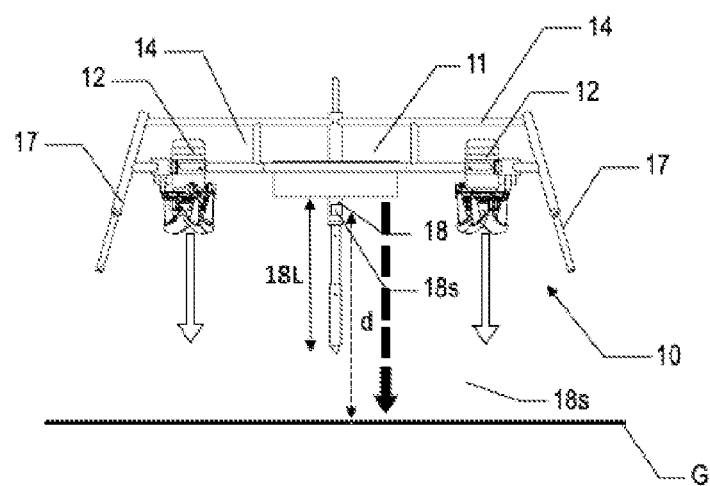
FIG. 5A shows a first front view of a non-limitative embodiment of a propulsion device according to the invention, during implementation of a step of a method for controlling the landing of said propulsion device.
Figure 5B:
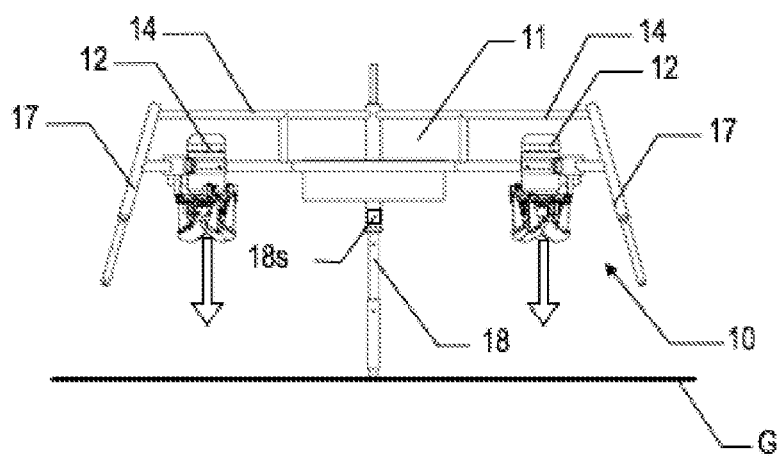
FIG. 5B shows a second front view of a non-limitative embodiment of a propulsion device according to the invention, during implementation of a subsequent step of a method for controlling the landing of said propulsion device.
Figure 5C:
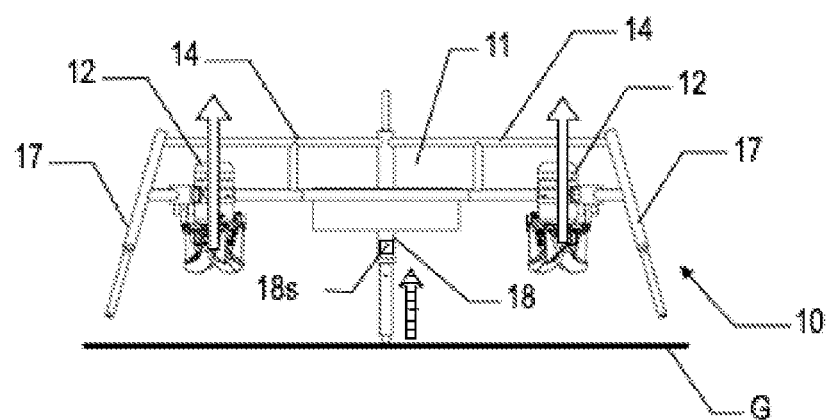
FIG. 5C illustrates diagrammatically a third front view of a non-limitative embodiment of a propulsion device according to the invention, during implementation of a subsequent step of a method for controlling the landing of said propulsion device.
Figure 5D:
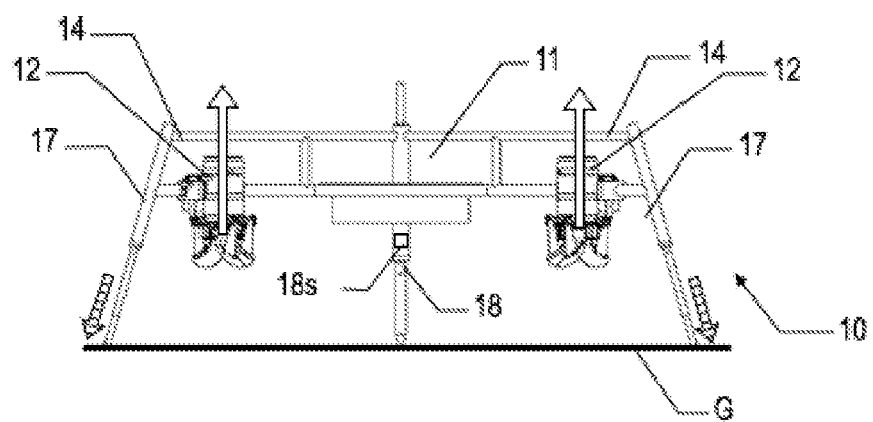
FIG. 5D illustrates diagrammatically a fourth front view of a non-limitative embodiment of a propulsion device according to the invention, during implementation of a subsequent step of a method for controlling the landing of said propulsion device.
Figure 5E:
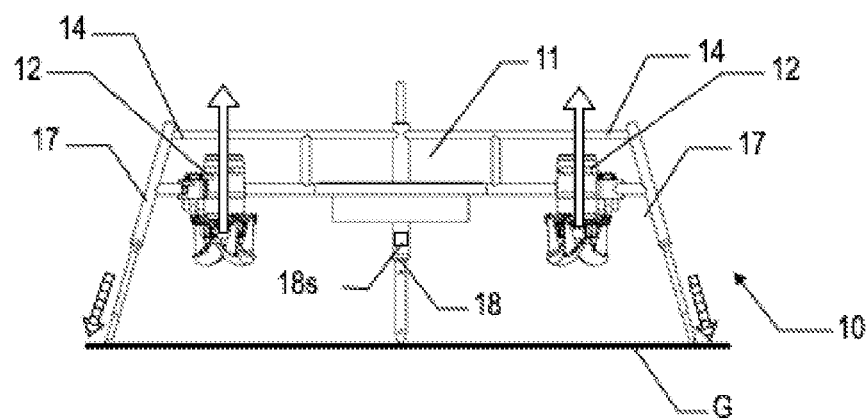
FIG. 5E illustrates diagrammatically a fifth front view of a non-limitative embodiment of a propulsion device according to the invention, during implementation of a subsequent step of a method for controlling the landing of said propulsion device.

FIG. 4 and FIGS. 5A and 5E show different views of a non-limitative embodiment of a propulsion device according to the invention. More particularly, FIGS. 5A to 5E illustrate diagrammatically different views of a non-limitative embodiment of a propulsion device according to the invention, respectively during the different phases or steps of a landing of said propulsion device, such a landing being capable of being carried out directly by means of a method for controlling the landing of such a propulsion device, a non-limitative example of which will be described hereinafter with reference to FIG. 6.

According to FIGS. 4 and 5A to 5E, a propulsion device 10 includes a main body in the principal form of a platform 11 on which a passenger can optionally board. Depending on the dimensions of the platform 11 and the power of the thrust unit 12 of the device 10, several passengers can optionally be simultaneously on board said platform 11. To this end the platform 11 can have one or more zones 11a arranged to receive and/or hold the passenger(s) on the platform, by means for example of their feet or even footwear.

As a variant, according to the type of propulsion device, such as for example a helicopter, the invention provides for the platform to be capable of comprising a fuselage consisting of the frame or cabin of the helicopter within which one or more passengers and/or (co-)pilots can be on board. As a variant or in addition, said platform can also be arranged or adapted to provide the transport of goods or freight, jointly with, or separately from, any passenger(s) that may be on board said platform. More broadly, such a platform makes it possible to provide the assembly and stability of all the elements composing the propulsion device. However, the invention is not limited to these platform examples alone. Thus, any means or object, regardless of its form, dimensions, composition and/or arrangement, suitable for providing a similar function, could be employed to constitute the platform 11 of a propulsion device 10 according to the invention.

A propulsion device includes a thrust unit 12. Within the meaning of the invention and throughout the document, by "thrust unit", also known as "thruster", is meant any appliance or object arranged to create a force, known as "thrust", such a thrust resulting from the acceleration of an air mass in the opposite direction to its movement. Depending on the configuration of the propulsion device, the thrust unit can have various arrangements and forms. When a propulsion device according to the invention consists of a helicopter for example, the thrust unit of the latter can comprise a wing system, comprising one or more lift and/or anti-torque propellors or rotors, such a wing system being controlled or actuated by a power train, generally constituted by a piston engine or one or more turbines advantageously cooperating with the wing system and allowing the rotors comprised within the wing system to be driven. As a variant, when the propulsion device consists of a "Flyboard Air", the thrust unit of the latter can consist of any propulsion device, commonly used in aeronautics, which converts the potential energy contained in a fuel, for example kerosene or equivalent, in association with an oxidizing agent, in this case ambient air aspirated via a fluid intake of the body, into kinetic energy. This kinetic energy generates a reaction force in an elastic medium, in the opposite direction to the jet of gaseous discharge. This results in an acceleration of a certain quantity of air between the fluid intake of the thruster or thrust unit and the jet nozzle thereof, producing a thrust by expansion in said jet nozzle. Such a thruster generally uses an air compressor with vanes or rotors. Any other type of fuel could optionally be utilized instead of the kerosene mentioned above. As a variant or in addition, the thrust unit of such a propulsion device can advantageously consist of a pair of thrust sub-units 12a and 12b each comprising two thrusters.

Preferably but non-limitatively, according to the embodiment example described with reference to FIGS. 4 and 5A to 5E, a propulsion device 10 according to the invention can include four thrust units 12. Each of the thrust units can optionally comprise a deflector assembly provided with two deflector elements, such deflector elements being mounted mobile just downstream of the exhaust outlet of the nozzle of the jet turbine engine, assuming a vertically-oriented jet turbine engine, these latter being capable of actuation and positioning in the thrust exhaust and/or stream path, so as to control the thrust force delivered by each of the thrust units. The configuration example described with reference to FIGS. 4 and 5A to 5E, although not limiting the invention, has certain positive features in comparison with other thrust unit configurations. In fact, a device 10 could move with a thrust unit limited to a single thruster, for example of the thermal jet turbine engine type. However, this configuration would have too great a space requirement to allow said propulsion device to be able to move and be controlled with ease. In fact, the length of such a single thruster such that the latter would be able to deliver a sufficient thrust to propel the device 10 and its passenger, if any, in the air would be of the order of a metre or even more. Similarly, a propulsion device including two thrust units does not prove really satisfactory: the space requirement of each thrust unit would indeed be limited, but the propulsion device would retain a major drawback in terms of safety, similarly to the single-thruster configuration described above. In fact, if one of the two thrust units should malfunction, the total thrust of the unit would be insufficient to maintain the propulsion device in the air and to retain sufficient manoeuvrability. Unlike these two possible configurations, a configuration as illustrated with reference to FIGS. 4 and 5A to 5E, according to which a propulsion device includes four thrust units, offers a particularly beneficial compromise. Thus, the space requirement occasioned by the four thrusters, for example reactors, remains fully compatible with the sought modes of use. Moreover, the propulsion device 10 remains perfectly manoeuvrable, even if one of the thrusters should malfunction. According to the preferred but non-limitative embodiment example of a propulsion device, the thrust unit of the latter can be arranged to supply a resultant thrust force oriented in a direction such as to supply a substantially vertical take-off and landing capability. However, the invention is not limited to the number, type or arrangement of the thrust unit(s) present within the propulsion device.

For the sake of simplicity, FIGS. 4 and 5A to 5E do not show the majority of the electronic elements. By way of example, as will be seen in the description of the thrust unit 12 with reference to FIG. 6, in order to allow the operation of the thrust unit(s) 12 present within said propulsion device 10, the latter also comprises command means 12$m$ cooperating with the thrust unit(s) 12. Such command means 12$m$ can be arranged in particular to control the power of said thrust unit. Furthermore, said command means can also cooperate with or include sensors, such as, non-limitatively, in inclinometer, an accelerometer and/or a gyroscope, suitable for delivering information relating to the attitude or more generally the path of the propulsion device 10. Said command means can thus be arranged to generate power or control commands of a thrust unit 12, according to the instructions of a passenger or of a remote operator transmitted via a human-machine input interface 40, otherwise called human-machine setpoint interface 40 in the present description, such as a remote control including buttons or a touch-screen, a microphone, or other technical means making it possible to translate a gestural sign or voice instruction of a human into a digital sign or data item, and/or information or data produced by such sensors. Such command means can be provided in the form of one or more electronic boards, advantageously positioned close to the centre of inertia of the propulsion device 10, in particular if the sensors are comprised in said electronic board(s).

According to FIGS. 4 and 5A to 5E, a propulsion device according to the invention includes support means 14 arranged to hold and support said thrust unit(s) 12. As in the solutions described above, such means 14 constitute the functional equivalent of a frame supporting the platform 11. The support means 14 integrally cooperate with said platform 11 via one or more suitable mechanical links, but also with the thrust unit(s) present within said propulsion device 10. Preferably but non-limitatively, according to FIGS. 4 and 5A to 5E, such mechanical links can advantageously consist of fixed links. By way of a preferred but non-limitative example, according to FIGS. 4 and 5A to 5E, the support means 14 of such a propulsion device 10 according to the invention can advantageously consist of a tubular structure including a plurality of tubes and/or beams, advantageously hollow in order to reduce the weight thereof. The purpose of said structure 14 consists of embodying a skeleton or a mechanical structure of the propulsion device 10. The material(s) that can be used to constitute such a structure 14 can be selected from aluminium, a stainless alloy, or even carbon fibres or any other suitable polymers, i.e. more generally, any material having functional characteristics favouring light weight and strength.

Furthermore, in order to facilitate the take-off and landing of the propulsion device, a device 10 according to the invention includes projecting means 17, capable of also being similar to a landing gear, integrally cooperating via suitable mechanical links with the platform 11 and arranged to prevent any impact or direct contact between the ground or more broadly a receiving surface and a thrust unit 12 of the device 10, when the latter is positioned below the platform 11, as described in particular with reference to FIGS. 4 and 5A to 5E, during landing and/or take-off of the latter. Finally, said projecting means 17 are arranged to provide the contact between a receiving surface G and the propulsion device 10.

Such means 17 can comprise or consist in particular of four legs. Each projecting means 17 has an end called "proximal" representing the part of the leg closest to the platform 11, and an end called "distal" representing the part of the leg the furthest from the platform 11 and the closest to the receiving surface G. The distance between its proximal end and its distal end is known throughout the remainder of the present description as the length 17L of each projecting means 17. These projecting means 17 in the form of legs have sufficient respective lengths so that the thrust unit(s) 12 cannot impact the ground and possibly damage the thrust units, and also to provide some stability, when the device is positioned on the ground or, more generally, on a receiving surface, such as a take-off site. According to FIGS. 4 and 5A to 5E, as the platform has a substantially square or rectangular shape, said four legs can advantageously be positioned at the periphery, more particularly but non-limitatively, at the four corners of the platform. As a variant, such projecting means 17 could consist of a pair of skis or any other suitable elements for providing some stability depending on the nature of the ground or of the device support on which such a device is capable of landing. Also, according to the type of propulsion device, the projecting means 17 can comprise two landing skids, such as those commonly employed today with reference to helicopters.

As a variant or in addition, to avoid a propulsion device impacting an obstacle during the flight phases, such projecting means 17 can be partially or wholly retractable, foldaway and/or telescopic, thus making it possible to modify the dimensions, in particular but non-limitatively the length or the height, of the projecting means 17. By way of non-limitative examples, according to FIGS. 4 and 5A to 5E, the projecting means 17 in the form of four legs, optionally peripheral, can consist of four telescopic columns. Regardless of the arrangements of the projecting means 17, when the latter are wholly or partially retractable, foldaway and/or telescopic, in order to modify the dimensions of the projecting means 17, a propulsion device 10 according to the invention can include actuators 17$a$ respectively cooperating with the projecting means 17, each actuator 17$a$ respectively being arranged to induce jointly or separately a translational movement of said projecting means 17. By way of non-limitative examples, according to FIGS. 4 and 5A to 5E, when the projecting means 17 consist of four peripheral legs in the form of telescopic columns, such actuators 17$a$ can consist of four cylinders or linear actuators.

As will be seen hereinafter, said actuators 17$a$ can be controlled by a processing unit 30, shown diagrammatically in dashed lines in FIGS. 4 and 5A, tasked with providing total control of the attitude and the paths of the propulsion device 10, more particularly of the landing of the propulsion device on a receiving surface G in motion and/or the dimensions of which can be relatively limited or small, i.e. of the order of the space requirement of the projected surface of said propulsion device 10 on the receiving surface G, also known as "covered area", by joint utilization of control setpoints and measurements originating from sensors. To this end, each actuator 17*a*, or more generally each projecting means 17, can be associated with a sensor, not shown in the figures, such as a proximity sensor, tasked with delivering to said processing unit 30, a digital or analogue representation of a measurement of a distance between said proximity sensor cooperating with the actuator or more broadly the projecting means and a receiving surface G. Such a sensor can be based on optical detection, for example by means of infrared, ultrasonic or even inductive laser diodes: the sensor is then advantageously contactless. By way of non-limitative examples, such a sensor can comprise or consist of a Foucault current or ultrasound sensor, a laser, capacitive, inductive or optoelectronic sensor. As a variant, the invention provides for such a sensor to be advantageously based on a contact detection: such a sensor can then comprise or consist of a stress or deformation gauge, a pressure probe, such as a piezometer, or even an end-of-travel sensor. The choice of a particular type of sensor with respect to another can mainly depend on the type, the arrangement or even the dimensions of the propulsion device 10 that it is desired to equip. However, the invention is not limited to these example sensors only. Any means or object making it possible to carry out a distance or contact measurement between said sensor and a receiving surface could be employed. The invention also provides for the utilization of a plurality of proximity sensors as a function of the structure of the propulsion device 10. Furthermore, such a processing unit 30 can also control the means of command 12*m* of the thrust unit(s) in order to regulate the thrust force delivered by the thrust unit(s) 12 present within the propulsion device.

In order to allow a landing of a propulsion device 10 according to the invention that is controlled and optimized, the latter also includes a proximity sensor 18*s* arranged to deliver a measurement M18*s*1, M18*s*2 representative of a distance d between said proximity sensor 18*s* and the receiving surface G on which a propulsion device 10 according to the invention desires to make a landing or possibly a water landing. Utilization of said proximity sensor 18*s* with reference to a propulsion device 10 according to the invention proves particularly advantageous, since it makes it possible to better assess, optionally in real time, the distance between the propulsion device 10 and a receiving surface G, in particular when such a receiving surface G is in motion and/or has small dimensions. As mentioned above, currently, when said receiving surface is in motion and/or has small dimensions, the pilot or more broadly the operator of the propulsion device must then demonstrate expertise and skill so as to make a landing or water landing in complete safety: the ability of the pilot has a direct influence on the successful performance of the landing or water landing, such a landing or water landing being generally irreproducible and a function of the pilot of the propulsion device that it is desired to land or water land, whether the pilot is on board within said device or remote from the latter: the presence of such a sensor is intended to reduce the influence of the pilot's or the operator's skill on the successful performance of the landing or water landing.

Such a proximity sensor 18*s* can be based on optical detections, for example by means of infrared, ultrasonic or even inductive laser diodes: the sensor is then advantageously contactless. By way of non-limitative examples, such a proximity sensor 18*s* can comprise or consist of a Foucault current or ultrasound sensor, a capacitive, inductive or optoelectronic laser sensor. As a variant, the invention provides for such a proximity sensor 18*s* to be advantageously based on a contact detection: such a sensor can then comprise or consist of a stress or deformation gauge, a pressure probe, such as a piezometer, or even an end-of-travel sensor. The choice of a particular type of sensor with respect to another can mainly depend on the type, the arrangement or even the dimensions of the propulsion device 10 that it is desired to equip. However, the invention is not limited to these example sensors only. Any means or object making it possible to carry out a distance or contact measurement between said sensor and a receiving surface could be employed.

Generally, said proximity sensor 18*s* is onboarded within said propulsion device and as a consequence integrally cooperates with an element of the propulsion device 10, such as for example, the platform 11, the support means 14 or the projecting means 17, via a suitable mechanical link. Preferably but non-limitatively, in order to provide a measurement of distance d between the proximity sensor 18*s* and the receiving surface G that is as accurate as possible, the mechanical link between these two elements can advantageously consist of a fixed link: the proximity sensor 18*s* can thus be fixed using any suitable fastening means to the propulsion device. As a variant or in addition, the invention provides for the proximity sensor 18*s* to be positioned as close as possible to the centre of inertia or to the centre of gravity of the propulsion device 10, the two centres being merged in the atmosphere. According to FIGS. 4 and 5A to 5E, the proximity sensor 18*s* can advantageously cooperate with the lower face of the platform 11.

As mentioned above, one of the objectives of the invention consists of proposing a propulsion device of which the landing or water landing on a receiving surface G in motion and/or having small dimensions is greatly facilitated and/or optimized. One of the main obstacles, during such a landing or water landing, resides in the difficulty of finding a good compromise between the contact of the propulsion device with the receiving surface G and the stability necessary to maintain the equilibrium of said propulsion device with respect to the receiving surface G. In order to overcome this drawback, a propulsion device 10 according to the invention can also include a central leg 18 integrally cooperating via a suitable mechanical link at its proximal end with the platform 11, more particularly the lower face. Within the meaning of the invention and throughout the whole document, by "central leg" is meant a substantially longitudinal or longilinear, rigid or flexible body, the longitudinal axis of the central leg passing substantially through the centre of inertia of the propulsion device. Such a central leg 18 has an end called "proximal" representing the part of the central leg 18 closest to the platform 11, and an end called "distal" representing the part of the central leg 18 the furthest from the platform 11 and the closest to the receiving surface G. The distance between its proximal end and its distal end is known throughout the remainder of the present description as the length 18L of the central leg 18. The length 18L of said central leg 18 is greater than the length 17L of each projecting means 17 or, when they are positioned below the platform 11, than that of the thrust unit(s) 12. The utilization of such a central leg 18, the length 18L of which is greater than that of the other elements of the propulsion device 10, proves particularly advantageous, since this allows it to provide the "first" contact between the propulsion device 10 and the receiving surface G on which the device is intended to land, thus making it possible to improve the control of the landing or water landing.

As a variant or in addition, so as to attenuate the effect of the impact or of the contact between the propulsion device 10 and the receiving surface during landing or water landing of said device 10, the central leg 18 can, at its distal end, include or integrally cooperate with a damper object or material, not shown in the figures for the sake of simplicity. By way of non-limitative examples, such a damper can consist of a piece of a flexible material, such as rubber, polyurethane, arranged to integrally cooperate via a fixed link with the distal end of the central leg 18. As a variant or in addition, such a damper can comprise a shock-absorber, a hydraulic damper with springs or blades or even a pneumatic damper. The invention is not limited by the type of damper cooperating with the central leg. Preferably but non-limitatively, the invention provides for the central leg to also be able to cooperate via any suitable mechanical link with said platform 11: the type of mechanical link providing the cooperation between the platform 11 and the central leg 18 will depend mainly on the arrangement and the dimensions of the central leg 18.

As mentioned above, in order to allow a controlled, optimized landing of a propulsion device 10 according to the invention, the latter can also include a proximity sensor 18s arranged to deliver a measurement M18s1, M18s2 representative of a distance d between said proximity sensor 18s and the receiving surface G on which a propulsion device 10 according to the invention desires to make a landing or possibly a water landing. Also as mentioned above, when the receiving surface G provided for the landing or the water landing is in motion or has small dimensions, one of the difficulties consists of targeting correctly the receiving surface G, while providing a controlled landing or water landing, i.e. in particular, not causing any lateral displacement of the propulsion device 10, the latter then being likely to "miss" or to slip from the receiving surface or to impact third party objects or infrastructures. To this end, the proximity sensor 18s can integrally cooperate via a suitable mechanical link, preferably but non-limitatively a fixed link, optionally reversible, with the central leg 18. The cooperation between the proximity sensor 18s and the central leg 18 proves particularly advantageous, as the sensor makes it possible to measure accurately and in real time the distance between the receiving surface G and the central leg which provides the first contact with the receiving surface G.

Furthermore, the position of the proximity sensor 18s with respect to the central leg 18 depends on different factors, more particularly:
 the arrangement and/or the type of sensor 18s employed: the contact detection, for example during the utilization of an end-of-travel sensor, a strain gauge or a pressure gauge, requires positioning and cooperation of the proximity sensor 18 with the distal end of the central leg 18, such a distal end being intended to provide the "first" contact between the receiving surface G and the central leg. Conversely, utilization of a contactless sensor, such as a laser sensor, makes it possible to position said sensor throughout the length of the central leg, the laser sensor having a wide detection range extending up to several metres. As a variant, since capacitive or inductive sensors generally have a shorter range, such sensors can be positioned around the distal end;
 the structure and composition of the central leg 18, the central leg being capable of having a relatively rigid or relatively flexible structure. By way of non-limitative examples, according to FIGS. 4 and 5A to 5E, as the central leg consists of a telescopic column and thus has a relatively rigid structure, the proximity sensor 18s, in the advantageous but non-limitative form of a laser sensor, can cooperate with said central leg 18 around its proximal end and the lower face of the platform 11.

As a variant or in addition, to avoid a propulsion device impacting an obstacle during the flight phases, such a central leg 18 can be partially or wholly retractable, foldaway and/or telescopic, thus making it possible to modify the dimensions, in particular but non-limitatively the length or the height, of said central leg. By way of non-limitative examples, according to FIGS. 4 and 5A to 5E, such a central leg 18 can advantageously consist of a telescopic column. Regardless of the arrangement of the central leg 18, when the latter is wholly or partially retractable, foldaway and/or telescopic, in order to modify the dimensions of the central leg, a propulsion device 10 according to the invention can include an actuator 18a cooperating with the central leg, the actuator 18a being arranged to induce a translational movement of said central leg 18 or generally, induce the deployment of the central leg 18. By way of non-limitative examples, according to FIGS. 4 and 5A to 5E, when the central leg 18 consists of a telescopic column, such an actuator 18a can consist of a cylinder or linear actuator.

Like the actuators 17a of the projecting means 17, as will be seen hereinafter, said actuator 18a can be controlled by the processing unit 30 of a propulsion device 10 according to the invention, tasked with providing total control of the attitude and the paths of the propulsion device 10, more particularly of the landing of the propulsion device on a receiving surface G in motion and/or having small dimensions, by joint utilization of control setpoints, via utilization of the human-machine input interface 40, and measurements originating from the sensors.

More particularly, it will be seen hereinafter that the actuators 18a, 17a, respectively associated with the central leg 18 or with the projecting means 17, can be controlled by electrical commands C17a, C18, C18a', the processing unit 30 of said propulsion device 10 being designed to generate said electrical commands C17a, C18, C18a' based on a control setpoint and/or a reference system MS1, MS2 determined by one or more configuration parameters. Such configuration parameters can be determined beforehand upstream of the utilization of the propulsion device.

As a variant or in addition, in order to allow a passenger 1, when a propulsion device 10 according to the invention is intended to provide the transportation of one or more passengers, or more broadly an operator of said device, to interact with a thrust unit 12 or any other component of said device 10, the latter can include or cooperate with a human-machine setpoint interface 40, of the remote control type for example, the primary function of which is to translate a gestural sign of said passenger 1 or operator to a determined setpoint. More particularly, such a human-machine setpoint interface 40 can in particular be designed to translate a gestural sign of a user to an actuation setpoint of the central leg 18 and/or of the projecting means 17 or even control of the thrust unit(s) 12. Such a human-machine setpoint interface 40 in the form of a remote control can be arranged to be held in the hand of the passenger 1 or more broadly of the operator or user: said remote control can advantageously be at a distance. By way of non-limitative example, said interface 40 can be similar to a pistol-type remote control, in particular including a trigger the travel of which can be interpreted as an instruction to increase the power of the thrust unit 12, when the trigger is actuated by the passenger 1 or the operator, and to reduce said power when said trigger is gradually released by its user. Such an interface 40 can also include other components such as one or more buttons, for example press-buttons, for optionally establishing setpoints for starting or shutting down the thrust unit 12, establishing setpoints for actuation of the central leg 18 and/or of the projecting means 17 or even to activate an assisted landing procedure. The activation of such an assisted landing process via such a press-button when the propulsion device 10 is substantially positioned above the receiving surface G, can thus consist of inducing the implementation of an automatic landing process, the propulsion device 10 automatically implementing the various steps to ensure its landing. In order to interpret such gestures of its user, the interface 40 can include electronic processing means of the different items of information collected by the trigger and other buttons to produce setpoints that can be interpreted by the means for processing such setpoints, more particularly the processing unit 30, onboard within the propulsion device 10. In order to route said setpoints to these latter processing means, the human-machine input interface 40 and the processing unit 30 of the device 10 can cooperate via wired or advantageously wireless communication means 41, for example by radio channel.

Figure 6:
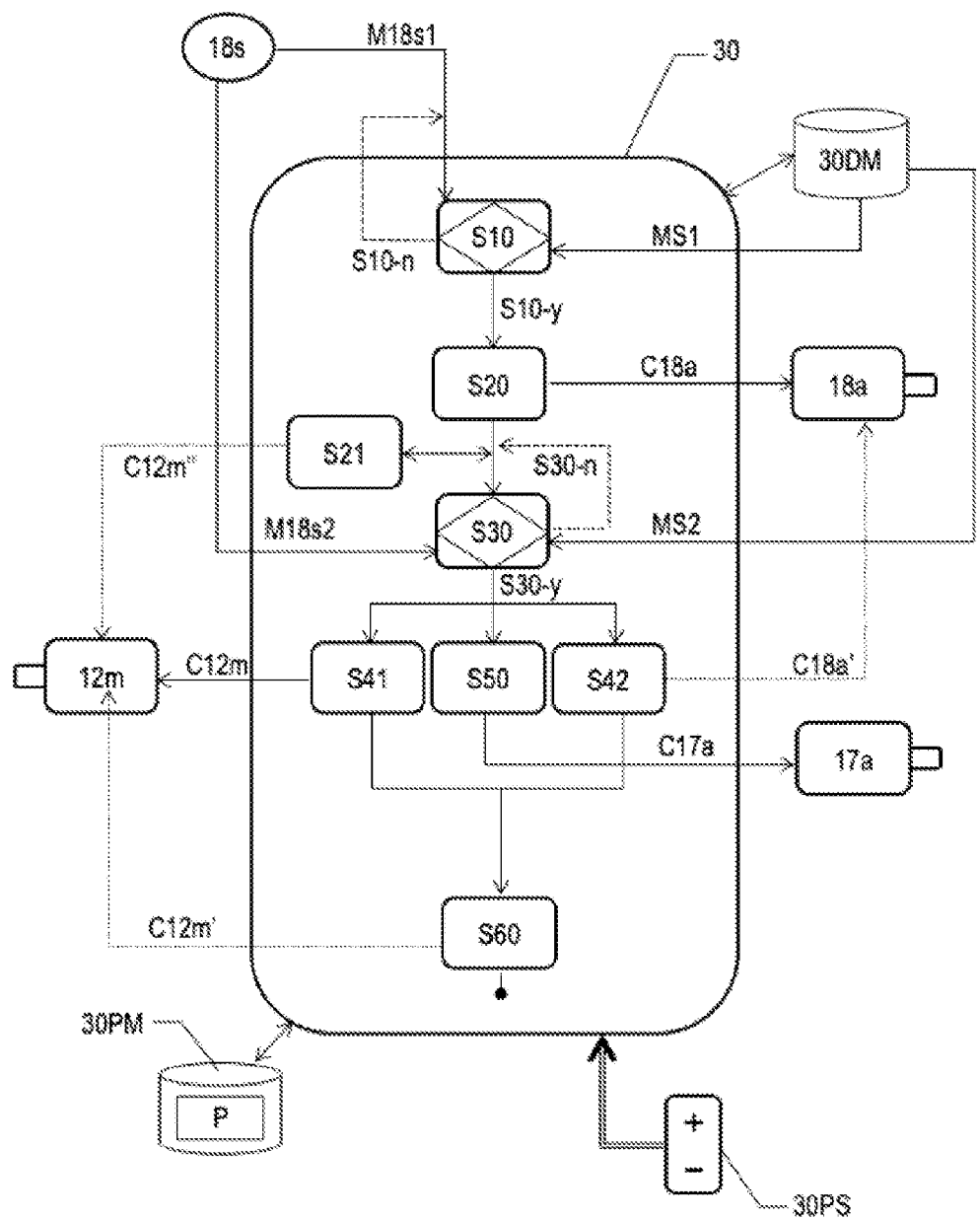
FIG. 6 illustrates diagrammatically a flowchart of a non-limitative embodiment of a method for controlling the landing of a propulsion device according to the invention.

So that the propulsion device 10 can optionally and advantageously deliver particularly innovative assistance to its user, despite being optionally capable of being disengaged on demand or specific authorization, whether the latter is a passenger or operator, a functional architecture will now be examined, with reference to a non-limitative example illustrated by FIG. 6, according to which different setpoint and/or operational control components of said propulsion device make it possible to implement a control method, also known as assistance method, of the landing or water landing of said propulsion device 10 on a receiving surface G, which may be moving or have small dimensions, thus assisting, or even controlling, the paths, attitudes and altitudes in response to setpoints from the user or from the configuration parameters, said setpoints or configuration parameters being filtered with respect to a customizable context of operation according to the embodiment of such a propulsion device 10 according to the invention, so as only to retain and translate into orders or commands those setpoints and parameters considered to be relevant by the processing unit 30 of said propulsion device 10.

With reference to FIGS. 5A to 5E and 6, such a propulsion device 10, developing automatic assistance for its user, includes a processing unit 30 in the form of one or more microcontrollers or processors, or even digital-to-analogue signal converters. Said processing unit 30 is tasked in particular with delivering control commands C17a, C18, C18a' of the actuators 17a and 18a, providing the deployment or more particularly the translational movement of the projecting means 17 and the central leg 18 associated respectively with said actuators 17a and 18a, and power or control commands C12m, C12m' of the command means 12m of the thrust unit(s) 12, controlling the power of said thrust unit(s) 12. In order to deliver such control commands C17a, C18, C18a', C12m, C12m', these latter must be generated by the implementation of a method for controlling the landing of a propulsion device according to the invention. Implementation of such a method, the main steps of which S10, S20, S30, S41, S42, S50 and S60 are illustrated in FIG. 6, by the processing unit 30 can advantageously be induced by the interpretation or the execution of instructions of a computer program product P said instructions of which have been loaded or written beforehand to a program memory 30MP, cooperating via a wired communication bus or by coupling, with said processing unit 30. Such a processing unit 30 can also include or cooperate with, like the program memory 30MP, a data memory 30DM intended to collect data delivered by other components, for example from sensors, such as for example the proximity sensor 18s, and/or human-machine setpoint interfaces 40, before or after processing by the processing unit 30. Such a data memory 30DM can also record one or more configuration parameters restricting the degrees of freedom that it is desired to allow the user or the operator with respect to the receiving surface G. By way of non-limitative examples, such configuration parameters can determine a reference system, for example, in the form of reference distance measurements between the proximity sensor 18s and the receiving surface G, corresponding to predetermined thresholds.

As mentioned above with reference in particular to FIGS. 4 and 5A to 5E, the user of a propulsion device 10 can indicate to the processing unit 30, for example via a determined gestural sign, an actuation setpoint of the central leg 18 and/or of the projecting means 17 or even of control of the thrust unit(s) 12, in particular in the case of failure of the automatic closed-loop control of the landing process of the propulsion device 10. To this end, as mentioned above, a propulsion device 10 according to the invention can comprise or cooperate with a human-machine setpoint interface 40 that may be similar to a pistol-type remote control, in particular including a trigger and other components, such as buttons. The travel of each of the components, such as a pressure on a dedicated press-button, can be measured by a suitable sensor, for example an inductive sensor, advantageously Hall-effect, such a sensor being particularly accurate by virtue of its function of amplification of the measurement signal, thus limiting any noise resulting from the environment. For example, a first press-button and a first associated sensor can advantageously cooperate with a first actuator 18a associated with the central leg 18. A first signal C18a, delivered by such a first sensor, can be considered as translating a setpoint to actuate the central leg 18, such as to induce the deployment of the central leg 18. A second signal C18a', still delivered by such a first sensor, can be considered as translating a setpoint to actuate the central leg 18, such as to induce the withdrawal of the central leg 18. Also, as a variant or in addition, a second press-button and a second associated sensor can advantageously cooperate with second actuators 17a associated with the projecting means 17. A first signal C17a, delivered by such a second sensor, can be considered as translating a setpoint to actuate the projecting means 17, such as to induce the joint or separate deployments of the projecting means 17. However, the invention is not limited to these example components only. As mentioned above, the human-machine setpoint interface 40 of a propulsion device 10 according to the invention can also include a trigger and/or a third press-button cooperating with the thrust unit(s) 12, respectively associated with dedicated sensors delivering signals C12m, C12m'. Such signals C12m, C12m' can be considered as translating control instructions of the unit(s), so as to produce respectively a stabilizing thrust reversal and allow, or induce, shutting down of the thrust unit(s) 12. As a variant and/or in addition, other sensors could be associated with other human-machine setpoint interfaces. Such interfaces could themselves directly deliver data or signals characterizing instructions from the user of the propulsion device 10.

In order to automate the landing or water landing of a propulsion device 10 according to the invention on a given receiving surface G, the processing unit 30 advantageously cooperates wired or wirelessly with a proximity sensor 18s, optionally a set of sensors, as described above, making it possible to deliver at each instant a measurement M18s1, M18s2 representative of a distance d between said proximity sensor 18s and the receiving surface G. In the knowledge of the distance d between said proximity sensor 18s and the receiving surface G, the processing unit 30 can implement a method for controlling the landing of a propulsion device 10 according to the invention, a non-limitative example of which is illustrated in FIG. 6.

According to this example, the propulsion device 10 includes, optionally, a central leg 18 associated with an actuator 18a that the processing unit 30 can control in order to fold away or deploy said leg. The processing unit 30 of such a device 10 can implement a step S10 for collecting and comparing a first measurement M18s1 of distance d between the proximity sensor 18s and the receiving surface G delivered by the proximity sensor 18s to a first predetermined threshold MS1. When the first measurement M18s1 of distance d between the proximity sensor 18s and the receiving surface G delivered by the proximity sensor 18s is substantially equal to the first predetermined threshold MS1 (situation illustrated by the link S10-y in FIG. 6), the processing unit 30 can implement a step S20 for preparing and delivering a command C18a that can be interpreted by the first actuator 18a associated with the central leg 18 so as to allow, or induce, the deployment of said central leg 18. Such a step S20 is illustrated with reference to FIG. 5A. Conversely, (the situation illustrated by the link S10-n in FIG. 6), the processing unit 30 reiterates step S10 for collecting and comparing a first measurement M18s1 of distance d between the proximity sensor 18s and the receiving surface G delivered by the proximity sensor 18s to a first predetermined threshold MS1, until the first measurement M18s1 of distance d between the proximity sensor 18s and the receiving surface G delivered by the proximity sensor 18s is substantially equal to the first predetermined threshold MS1. Depending on the respective structures and dimensions of the propulsion device 10 and of the receiving surface G and also the surrounding environmental conditions of the landing, the first threshold MS1 may vary from a few centimetres to a metre. According to FIGS. 5A to 5E and 6, the deployment of the central leg 18, when the latter consists of a telescopic column, can be stopped once the travel of the telescopic column has been fully deployed. As a variant or in addition, the deployment of the central leg 18 can optionally be stopped by means of a setpoint component of a human-machine input interface 40, as described above. According to a variant embodiment of a method for controlling the landing of a propulsion device 10 according to the invention, when the latter includes a central leg 18 that is preferably flexible and perpetually deployed, said previously-described steps S10 and S20 of said method are not implemented or provided for.

Regardless of the configuration of the central leg 18, whether it is possible for the latter to be deployed on command or not, the processing unit 30 can implement a step S30 for collecting and comparing a second measurement M18s2 of distance between the proximity sensor 18s and the receiving surface G delivered by the proximity sensor 18s to a second predetermined threshold MS2.

When the second measurement M18s2 of distance d between the proximity sensor 18s and the receiving surface G delivered by the proximity sensor 18s is substantially equal to the second predetermined threshold MS2, the processing unit 30 can implement a step S50 for preparing and delivering a command C17a that can be interpreted by the second actuator 17a associated with the projecting means 17, so as to allow, or induce, the joint or separate deployments of the projecting means 17. Such a step S50 can optionally be implemented after a total withdrawal of the central leg 18, if the latter allows. Optionally, triggering of step S50 can be implemented, when a third measurement of distance between the proximity sensor 18s and the receiving surface G delivered by the proximity sensor 18s is substantially equal to a third predetermined threshold MS2. As a variant or in addition, the invention provides that each projecting means 17 can include a respective proximity sensor arranged to deliver a measurement representative of a distance between said proximity sensor associated with the projecting means 17 and the receiving surface. The processing unit 30 can then implement a sub-step S50a for collecting and comparing said measurement to a predetermined threshold.

As a variant or in addition, the invention provides that the processing unit 30 can implement a separate deployment of the projecting means 17. As mentioned above, landing a propulsion device can prove relatively tricky on a receiving surface that is in motion, for example, as the pilot or the operator must demonstrate some dexterity to be able to place each of the projecting means 17 on the receiving surface, while maintaining the equilibrium and stability of the propulsion device 10. The invention provides automated assistance with this difficulty by proposing a separate deployment of the projecting means 17. By way of non-limitative examples, according to the preferred embodiment described with reference to FIGS. 4 and 5A to 5E, the four peripheral legs 17 can be deployed separately and successively, each peripheral leg being associated with a second actuator 17a. Once the central leg 18 is in contact with the receiving surface G, the processing unit 30 can implement a first sub-step S51 for preparing and delivering a command that can be interpreted by the second actuator associated with a first peripheral leg 17, so as to allow the deployment of said first peripheral leg 17. Once the first peripheral leg is in contact with the receiving surface G, the processing unit 30 can implement a second sub-step S52 for preparing and delivering a command that can be interpreted by the second actuator associated with a second peripheral leg 17, so as to allow the deployment of said second peripheral leg. The deployment of the central leg 18, whether commanded or constant, and the deployment of the first and second peripheral legs 17 make it possible to produce three points of contact, resulting in the immobilization and stabilization of the propulsion device 10 on the receiving surface G. The processing unit 30 can then implement a third sub-step S53 for preparing and delivering commands that can be interpreted by the actuators associated with the third and fourth peripheral legs 17, so as to allow the respective deployments of said third and fourth peripheral legs.

When said second distance measurement M18s2 reaches the second predetermined threshold MS2, subsequently to, or even jointly with, step S50 for preparing and delivering a command C17a that can be interpreted by the second actuator 17a associated with the projecting means 17, the processing unit 30 can implement a step S41 for preparing and delivering a command C12m' that can be interpreted by the command means 12m associated with the thrust unit 12, so as to produce a stabilizing thrust reversal, also known as "reverse thrust". The creation of such a thrust reversal proves particularly judicious, since it allows the creation of a "vacuum cup" effect and thus clinging of the propulsion device to the receiving surface. The thrust reversal thus makes it possible to overcome the meteorological conditions that can directly affect the propulsion device 10 during the landing phase.

When the second measurement M18s2 of distance d between the proximity sensor 18s and the receiving surface G delivered by the proximity sensor 18s is substantially equal to the second predetermined threshold MS2 and therefore the projecting means 17 are deployed, subsequently to or jointly with step S50, the processing unit 30 can implement a step S42 for preparing and delivering a command C18a' that can be interpreted by the first actuator 18a associated with the central leg 18 so as to allow the withdrawal of said central leg 18: such a withdrawal can be known as active withdrawal. The withdrawal is generally initiated, advantageously after the deployment of the projecting means 17, represented by step S50, and therefore especially, when the second threshold is substantially zero and the central leg 18 enters into contact with the receiving surface G. Such a step S42 is illustrated with reference to FIG. 5C. Conversely, the processing unit 30 can reiterate step S30 for collecting and comparing a second measurement M18s2 of distance d between the proximity sensor 18s and the receiving surface G delivered by the proximity sensor 18s to a second predetermined threshold MS2, until the second measurement M18s2 of distance d between the proximity sensor 18s and the receiving surface G delivered by the proximity sensor 18s is substantially equal to the second predetermined threshold MS2 and thus step S50 can be carried out.

As a variant, the invention provides for the withdrawal of said central leg 18 to be carried out passively: in fact, owing to its structure, when the central leg 18 consists for example of a telescopic column equipped with one or more springs or return components, or even, when the central leg 18 is mainly constituted by a flexible material, the latter can be mechanically retracted as in FIGS. 5A to 5E and 6, the deployment of the central leg 18, when the latter consists of a telescopic column, can be stopped once the travel of the telescopic column has been fully deployed. As a variant or in addition, the deployment of the central leg 18 can optionally be stopped by means of a setpoint component of a human-machine input interface 40, as described above.

Finally, once the projecting means 17 are deployed and stabilized on the receiving surface G, the processing unit can implement a step S60, after the step S50 for preparing and delivering a command C17a that can be interpreted by the second actuator 17a associated with the projecting means 17, for preparing and delivering a command C12m' that can be interpreted by the command means 12m associated with the thrust unit 12, so as to allow, or induce, shutting down said thrust unit 12. Once the propulsion device 10 has been landed and is stabilized in complete safety, the thrust unit(s) 12 can be completely switched off.

According to an advantageous embodiment for facilitating a landing phase of the propulsion device 10, the invention also provides for such a method to be able to comprise, on approach of the contact between the receiving surface G and the distal part of said central leg 18, a step S21 for preparing and delivering a command C12m" that can be interpreted by the command means 12m associated with the thrust unit 12, so as to control the power of the thrust unit 12 and to produce a stabilizing thrust. Such a stabilizing thrust facilitates "gentle" contact of the central leg 18, and more broadly of the propulsion device 10, with the receiving surface G.

The example method for controlling the landing of a propulsion device 10 thus described could include other intermediate steps for taking account of other measurements, such as for example the power of the thrust unit(s) 12 of said propulsion device 10 or other setpoints or additional data, such as for example, measurements relating to the movements undergone by the receiving surface G or even the dimensions of said receiving surface G.

It is noted that in the absence of any control or actuator instruction by the user, implementation of the method for controlling the landing of the propulsion device automatically makes it possible to carry out an automatic landing on a given receiving surface, thus providing control assistance that is today unequalled for the passenger or the operator of such a propulsion device. Furthermore, such a method for controlling the landing of a propulsion device according to the invention makes it possible in particular to optimize the area of the receiving surface required for carrying out such a landing and reducing the impacts with foreign bodies.

Furthermore, the processing unit 30 can include or cooperate with one or more sources of electrical supply 30PS, tasked with supplying electricity to the active elements, the processing unit itself and/or sensors or actuators of a propulsion device 10 according to the invention.

Finally, the invention provides for the processing unit 30 to be able to record a history of the control and/or actuation instructions and/or commands produced, or even distance data that may be delivered by the proximity sensor 18s or any other on-board sensor within the propulsion device, for purposes of monitoring or supervision of the utilization of a propulsion device 10 according to the invention. Such a history can be saved in the data memory 30DM and be read-accessible from a communicating electronic object, for example a personal computer, a smart mobile phone or an interactive tablet, for consultation. Such a communication can also make it possible to modify the program P written to the program memory 30PM and/or certain configuration parameters saved in said data memory 30DM, in order to modify on demand the behaviour of the propulsion device 10 and the automatic assistance delivered by the latter during its landing. It is thus possible to modify all or part of the instructions and/or data of parameters utilized by the program product P inducing the implementation of the method for controlling by the processing unit 30.

The invention claimed is:

1. A method for controlling the landing of a propulsion device which includes:
   a platform,
   a thrust unit,
   support means arranged to hold and support said thrust unit, integrally cooperating via one or more mechanical links with said platform,
   projecting means, integrally cooperating via mechanical links with the platform,
   actuators associated with the projecting means and controlled by electrical commands to induce a translational movement, jointly or separately, of said projecting means,
   a central leg, passing through a center of inertia of the propulsion device and integrally cooperating via a mechanical link at a proximal end of the central leg with the platform, the projecting means and the central leg are mutually arranged so that the central leg always provides a first contact between the propulsion device and a receiving surface for receiving said device,
   a proximity sensor arranged to deliver a measurement representative of a distance between said proximity sensor and the receiving surface, and
   a processing unit configured to generate said electrical commands based on a control setpoint and/or a reference system determined by one or more configuration parameters, said method being implemented by the processing unit of said propulsion device, said control method including:
a step for collecting and comparing a first measurement of distance between the proximity sensor and the receiving surface delivered by the proximity sensor to a first predetermined threshold; and
a step for preparing and delivering a command that can be interpreted by the actuators associated with the projecting means, so as to induce the joint or separate deployments of the projecting means.

2. The method according to the claim 1, wherein the step for preparing and delivering a command that can be interpreted by the actuators associated with the projecting means, so as to induce the joint or separate deployment of the projecting means, includes three sub-steps, in the case of a separate deployment of the projecting means, comprising:
 a. a first sub-step for preparing and delivering a command that can be interpreted by the actuator associated with a first projecting means, so as to induce the deployment of said first projecting means;
 b. a second sub-step for preparing and delivering a command that can be interpreted by the actuator associated with a second projecting means, so as to induce the deployment of said second projecting means; and
 c. a third sub-step for preparing and delivering commands that can be interpreted by the actuators associated with a third and a fourth projecting means, so as to induce the respective deployments of said third and fourth projecting means.

3. The method according to claim 1, further comprising a step, when said first distance measurement reaches the first predetermined threshold, for preparing and delivering a command that can be interpreted by a command means associated with the thrust unit, so as to produce a stabilizing thrust reversal.

4. The method according to claim 3, including a step, when the projecting means are deployed and stabilized in contact with the receiving surface, for preparing and delivering a command that can be interpreted by the command means associated with the thrust unit, so as to induce shutting down said thrust unit.

5. The method according to claim 1, wherein the propulsion device includes an actuator associated with the central leg, for which the central leg is retractable, the actuator being arranged to induce a translational movement of said central leg, said method also including two steps prior to the step for collecting and comparing a first measurement of distance between the proximity sensor and the receiving surface delivered by the proximity sensor to a first predetermined threshold, comprising:
 a. a step for collecting and comparing a second measurement of distance between the proximity sensor and the receiving surface delivered by the proximity sensor to a second predetermined threshold strictly greater than the first predetermined threshold; and
 b. a step for preparing and delivering a command that can be interpreted by the actuator associated with the central leg when said second distance measurement reaches the second predetermined threshold, so as to induce the deployment of said central leg.

6. The method according to claim 5, including a step, when the projecting means are deployed and stabilized in contact with the receiving surface, for preparing and delivering a command that can be interpreted by the actuator associated with the central leg, so as to allow the withdrawal of said central leg from the receiving surface.

7. A propulsion device including:
a platform,
a thrust unit,
support means arranged to hold and support said thrust unit, integrally cooperating via one or more mechanical links with said platform,
projecting means, integrally cooperating via mechanical links with the platform,
actuators associated with the projecting means and controlled by electrical commands to induce a translational movement, jointly or separately, of said projecting means,
a central leg, passing through a center of inertia of the propulsion device and integrally cooperating via a mechanical link at a proximal end of the central leg with the platform, the projecting means and the central leg are mutually arranged so that the central leg always provides a first contact between the propulsion device and a receiving surface for receiving said device,
a proximity sensor arranged to deliver a measurement representative of a distance between said proximity sensor and the receiving surface, and
a processing unit configured to generate electrical commands of actuators associated with said projecting means according to a method for controlling the landing in accordance to claim 1.

8. The propulsion device according to claim 7, further comprising an actuator associated with the central leg, for which the central leg is retractable, the actuator being arranged to induce a translational movement of said central leg and for which said processing unit generates electrical commands of said actuator associated with said central leg.

9. The propulsion device according to claim 8, further comprising a human-machine input interface configured to translate a gestural sign of a user to an actuation setpoint of the central leg and/or of a power of the thrust unit.

10. The propulsion device according to claim 7, wherein the platform is arranged to receive one or more passengers.

11. The propulsion device according to claim 7, wherein the thrust unit is arranged to supply a resultant thrust force oriented in a direction supplying a vertical take-off and landing capability to the propulsion device.

12. The propulsion device according to claim 7, wherein the projecting means comprise four peripheral legs.

* * * * *